Dec. 15, 1925.
E. V. JOHNSON
AMUSEMENT VEHICLE
Filed March 26, 1925
1,566,097
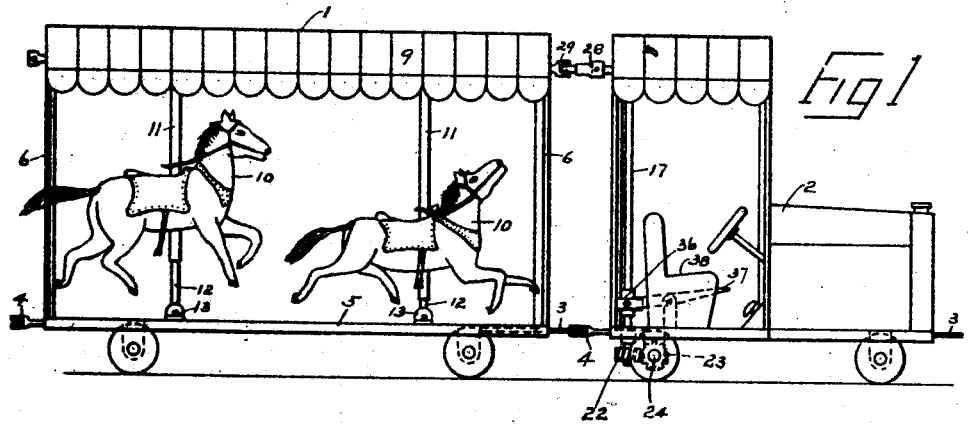
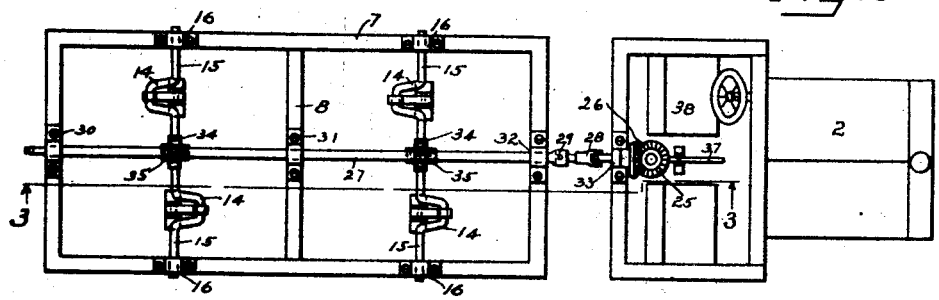
Ella V. Johnson,
Inventor,
by her Attorney.

Patented Dec. 15, 1925.

1,566,097

UNITED STATES PATENT OFFICE.

ELLA V. JOHNSON, OF WHITEHOUSE, FLORIDA.

AMUSEMENT VEHICLE.

Application filed March 26, 1925. Serial No. 18,394.

*To all whom it may concern:*

Be it known that I, ELLA V. JOHNSON, a citizen of the United States, residing at Whitehouse, in the county of Duval and State of Florida, have invented certain new and useful Improvements in Amusement Vehicles, of which the following is a specification.

My invention relates to amusement vehicles of new and novel designs and has for its main object to provide a vehicle which may be drawn over comparatively level ground and to impart to the passenger carrying elements on said vehicle, motions which are separate and distinct from that caused by its travel over the ground.

A further object is to provide means, on an automotive vehicle which is employed for drawing one or more of said passenger carrying vehicles, to supply the power for actuating the passenger carrying elements.

These and various other objects and advantages will be clearly understood from the following description and from the accompanying drawing of a preferred embodiment of my invention, but it will be readily seen that various modifications might be made without departing from the scope of the invention.

Fig. 1 is a side elevation of one of the passenger carrying vehicles and its automotive vehicle.

Fig. 2 is a plan view of the driving mechanism of these vehicles.

Fig. 3 is a sectional view of Fig. 2, taken on line 3—3.

Referring now to all the views, 1 is a passenger carrying vehicle and 2 is an automotive vehicle; they are coupled together by means of couplings 3 and 4. The vehicle 1 consists of a platform 5, under which the wheels are mounted. Four corner posts 6 support a roof frame 7. This roof frame, which is rectangular in shape and provided with a center member 8, is plainly shown in Fig. 2, but is hidden in Fig. 1 by the peaked canopy 9 which covers the vehicle. A plurality of passenger carrying elements 10 are mounted in the vehicle on rods 11, into which the lower rods 12 telescope. These lower rods are hinged in the slotted brackets 13 which are bolted to the platform 5.

The upper ends of the rods 11 are attached to the cranks 14, on the crank shafts 15 which revolve in the bearings 16, bolted to the roof frame 7. Motion is imparted to these cranks, and consequently to the passenger carrying elements, in the following manner: The automotive vehicle 2 contains a vertical shaft 17 supported in bearings 18 and 19, bolted, respectively, to the platform 20 and to the roof frame 21 and rotated by means of a spiral gear 22 driven by another spiral gear 23 which is rigidly mounted on the rear axle 24. While this method of rotating the vertical shaft 17 has been shown, any other suitable method may be employed. A bevel gear 25 is secured on the upper end of the vertical shaft and meshes with a bevel gear 26 secured on the horizontal shaft 27.

So as to allow for the turning of the vehicles, the shaft 27 is provided with two, telescoping, universal joints 28 and 29. The shaft 27 is supported above and at right angles to the crank shaft 15, in the bearings 30, 31, 32 and 33, and rotates these crank shafts by means of the spiral gears 34 and 35, secured, respectively, to the horizontal and crank shafts, as plainly shown on Fig. 3.

It will thus be seen that as the vehicle 1 is drawn by the vehicle 2, the passenger carrying elements 10 are raised and lowered. A friction clutch 36, having a clutch lever 37 operatable from the driver's seat 38, is provided so as to start or stop this movement at will. This also enables the driver to get the vehicles in motion before starting the movement of the passenger carrying elements.

It will be noted that several vehicles may be operated with one automotive vehicle and that by coupling the rear end of the train to the front end of the automotive vehicle, the whole train may be moved in a circle.

Having thus described my invention and its operation, what I claim as new and wish to protect by Letters Patent is—

1. In amusement vehicles of the class described; an automotive vehicle; one or more passenger vehicles; means for coupling said passenger vehicles to each other and to the automotive vehicle; a plurality of movable passenger carrying elements mounted in said passenger vehicles; and means for actuating all of said passenger carrying elements in all of said passenger vehicles by power transmitted from the automotive vehicle through a suitable transmission contained in and extending through all of said passenger vehicles.

2. In amusement vehicles of the class described; an automotive vehicle; one or more passenger vehicles; means for coupling said passenger vehicles to each other and to the automotive vehicle; a plurality of movable passenger carrying elements mounted in said passenger vehicles; means for actuating all of said passenger carrying elements in all of said passenger vehicles by power transmitted from the automotive vehicle through a suitable transmission contained in and extending through all of said passenger vehicles; and means, provided in the automotive vehicle, for starting and stopping the movements of said passenger carrying elements.

Signed at Jacksonville, in the county of Duval and State of Florida, this 23rd day of March 1925.

ELLA V. JOHNSON.